United States Patent [19]

Stahlberger et al.

[11] 4,125,631

[45] Nov. 14, 1978

[54] PREPARATION FOR THE MANUFACTURE OF FILMS COMPRISING A COLLAGENOUS MATERIAL AND LIQUID REACTION PRODUCT OF A HIGH MOLECULAR WEIGHT WATER-INSOLUBLE, ORGANIC MATERIAL

[76] Inventors: Bruno Stahlberger, Wiesenstrabe 10, Buchs, Switzerland; Werner von Dach, Zweistäpflestrabe 670, Balzers, Liechtenstein

[21] Appl. No.: 607,953

[22] Filed: Aug. 26, 1975

Related U.S. Application Data

[63] Continuation-in-part of Ser. No. 489,097, Jul. 17, 1974.

[30] Foreign Application Priority Data

Jul. 18, 1973 [DE] Fed. Rep. of Germany ....... 2336561
Aug. 29, 1974 [DE] Fed. Rep. of Germany ....... 2441419

[51] Int. Cl.$^2$ ...................... A22C 13/00; B28B 19/00
[52] U.S. Cl. ........................................ 426/105; 260/6; 260/15; 426/140; 264/239
[58] Field of Search ...................... 260/6, 15; 426/105, 426/140, 278

[56] References Cited

U.S. PATENT DOCUMENTS

| | | | |
|---|---|---|---|
| 3,301,692 | 1/1967 | Karjala et al. | 106/161 |
| 3,652,672 | 3/1972 | Kliegman et al. | 260/566 R |
| 3,997,508 | 12/1976 | Ziche | 260/72 R |

FOREIGN PATENT DOCUMENTS 783,051  9/1957  United Kingdom ................ 260/566 R

OTHER PUBLICATIONS

American Chemical Soc. Jour., Jun. 1962, pp. 2071-2074, Vail et al.
Chem. Absts: 76(1972) 101,236f, "Cylindrically-Collagen"; Battista.
Chem. Absts: 68(1968) 28624j, "Hardened-Sausage Casings-Boiling"; Rosmus et al.

*Primary Examiner*—Edward M. Woodberry
*Attorney, Agent, or Firm*—Brumbaugh, Graves, Donohue & Raymond

[57] ABSTRACT

Disclosed herein is a process for bringing amino-type compounds such as amines, amides, imines and proteins, containing —$NH_2$ and =NH groups, into liquid form, usually a solution, by reaction with glyoxals. The resulting liquids, which can dissolve further materials such as natural and synthetic fibres, are especially useful as hardeners for collageneous materials used in the preparation of films such as sausage casings. An especially preferred preparation for this purpose comprises an animal hide fibre composition and a precondensate formed from collagen scrap, e.g. waste skin casing or leather scraps, dissolved in a solution of glyoxal.

28 Claims, No Drawings

PREPARATION FOR THE MANUFACTURE OF FILMS COMPRISING A COLLAGENOUS MATERIAL AND LIQUID REACTION PRODUCT OF A HIGH MOLECULAR WEIGHT WATER-INSOLUBLE, ORGANIC MATERIAL

This application is a continuation-in-part of our co-pending Application No. 489,097 filed July 17th, 1974, the disclosure of which is incorporated herein by reference.

BACKGROUND OF THE INVENTION

In Application Ser. No. 489,097 we have described and claimed preparations for making shaped articles such as films, especially tubular films for the packaging of sausages. The preparations comprise collagen, for example in the form of an animal hide fibre composition, and a precondensate comprising
   (a) one or more structural units derivable from a compound containing at least one amine group, and
   (b) one or more structural units derivable from a compound containing at least one aldehyde group and/or one or more structural units derivable from a polyhydroxy compound.

Also disclosed are processes for making such preparations, methods for making shaped articles from the preparations and shaped articles so made.

OBJECTS OF THE INVENTION

It is one object of the present invention to provide a process for the manufacture of such shaped articles wherein the precondensate comprises the reaction product of glyoxal with a compound containing $-NH_2$ or $=NH$ groups, hereinafter sometimes called amino-type compounds.

It is another object of the present invention to provide such shaped articles and preparations for preparing the same which contain reaction products of glyoxals with compounds containing $-NH_2$ or $=NH$ groups.

It is a further object of the present invention to provide food products such as sausages encased in such films.

Finally it is an object of the present invention to provide a process for bringing compounds containing $-NH_2$ or $=NH$ groups into liquid form, especially as solutions, be reaction of said compounds with glyoxals.

SUMMARY OF THE INVENTION

The present invention is based upon our surprising discovery that said amino-type compounds can readily be brought into an especially suitable form for use in the manufacture of such films by reaction with glyoxal and substituted derivatives thereof. The resulting liquid vehicles, which are usually solutions, are especially suitable for use in the preparation of sausage casings, and are effective even when used in small amounts to yield films and tubes having a wet strength surpassing anything that has been achieved previously and thus may be used in accordance with the present invention in small quantities for hardening agents in the preparation of such films and casings from collagenous materials, such as animal hide fibres. The invention is especially applicable to such amino-type compounds containing collagen itself, for example in the form of natural scrap material, but is also generally applicable to other compounds containing $-NH_2$ or $=NH$ groups, such as amines, amides, imines and proteins. High molecular organic materials having a molecular weight of at least 20 000 are preferred as amino type compound e.g. proteins.

The manufacture of the reaction products of glyoxal or substituted glyoxals with such amino-type compounds to liquefy said compounds may be carried out in a simple manner by mixing the glyoxal or substituted glyoxal, preferably in the form of an aqueous solution, e.g. of about 40% strength, with the compound and then allowing it to stand until complete dissolution has occurred. Preferably the glyoxal is used in excess over the amino-type compound. Suitable ratios of glyoxal and amino-type compound are in the range of 0.5 to 5.0, preferably 0.8 to 1.5 moles glyoxal: 1.0 to 5.0, preferably 1.0 to 3.0 moles amino type compound, relative to the amino groups. The aqueous glyoxal solutions may vary in strength from 25 to 80, preferably from 30 to 50%; a solution of 40% is preferred.

The dissolution process can be accelerated, if desired, by heating and/or by stirring. Advantageously heating is effected at a temperature not substantially greater than 100° C because as the temperature rises above this point, the solutions become darker in colour. In general, heating is advantageously effected at a temperature not greater than 60° C even though the dissolution process is thereby lengthened. In this manner relatively light coloured solutions are obtained. In any case, the nature of the dissolution process depends upon the compound used and other conditions such as heating and/or stirring. Typically it will last for from 1/2 hour to 3 hours.

Amongst suitable proteinaceous compounds which can be liquified using the glyoxals there may be mentioned, for example, gelatin, casein, collagen, keratin, horn, wool and silk. Collagen can be used in many forms, for example in the form of hides, skin fibres, cured hide fibre casings, leather and natural gut. More especially, waste collagen, for example in the form of waste cured hide fibre casing and leather scraps can be dissolved in the glyoxal and then used as a hardening component for the compositions of the present invention. Amongst other compounds which are suitable for liquefaction by glyoxal are vegetable proteins, e.g. soy casein and vegetable globulins.

The hardening, e.g. cross-linking, properties of such proteins may be varied by dissolving other substances in them. In this respect, the reaction products of glyoxals with these amino-type compounds surprisingly exhibit an ability to dissolve other substances. In particular, a large number of orgnaic substances having quite a high molecular weight will dissolve (possibly with the use of heating). Amongst such substances there may be mentioned, for example, gelatin, collagen, elastin, keratin, fibroin, serine (in the form of horn, wool or silk), cellulose and cellulose derivatives, for example methyl cellulose, starch, wood (lignin) and plastics materials, e.g. polyamides, aminoplasts, polyesters, polyurethanes, polyimides (e.g. Nylon 6, Nylon 11, and Nylon 12) and caprolactams.

One example of the surprising and extensive dissolution power of glyoxal for such compounds is that when a complete animal body such as a mole is immersed in a condensate of glyoxal and a cured skin fibre casing, the body completely dissolves including skin, hair, claws, teeth, bones and pluck.

DESCRIPTION OF THE PREFERRED EMBODIMENTS

As will be appreciated from the above remarks, the liquefied amino-type products of the present invention are especially suitable for use in comparatively small quantities as hardening components in the manufacture of collagen-based films, for example in the preparation of sausage casings. In general the products may be used in amounts of from 0.1 to 5%, based on the weight of dry collagen, quantities of 0.2 to 4%, especially 1 to 3%, being preferred. It has been found that such amounts do not impair the storage stability of collagen compositions with respect to their extrudability.

Whilst the cross-linking of products such as gelatin and collagen with aldehydes such as formaldehyde, glyoxal and methyl glyoxal is known, it has surprisingly been found that the condensation products of glyoxal with the amino-type compounds, such as proteins, e.g. collagen, in accordance with the present invention have an increased cross-linking activity compared to glyoxal itself. The cross-linking activity of these condensates increases as the condensation time increases, the condensation temperature, usually about 100° C, remaining constant. Furthermore, in contrast to the simple aldehydes, the cross-linking activity increases as the pH value of the condensate decreases. In addition, apart from the use of such products as curing components for collagen compositions which, as mentioned above, offers advantages of high wet strength and the possibility of using waste collagen material, it has also been found that there is an additional advantage in that further softening agents such as glycerin and sorbitol can be omitted and thus that the known disadvantage of using such further softeners, because they reduce the wet strength of the collagen films, can be avoided.

In practice, the reaction products of the glyoxals and the amino-type compounds in accordance with the present invention, optionally with further additives, can be worked into the collagen compositions in a manner known per se, collagen compositions having dry contents of from 2 to 15%, especially from 6 to 15% by weight of collagen being preferred. Typical preparations of such animal hide fibre compositions are, for example, described in German Pats. Nos. 641,169 (U.S. Pat. No. 2,056,595) and 659,490 (U.S. Pat. No. 2,114,220). Advantageously the reaction products of the glyoxal and the amino-type compound can be kneaded into the collagen based material using conventional mixing apparatus provided that the collagen compositions have a comparatively high content of dry material, of greater than 6%, e.g. from 8 to 14%, and do not require solidification by means of special coagulation baths after extrusion. When collagen sludges having a smaller dry content, e.g. 0.5 to 4%, of collagen are used then these aqueous sludges should be shaped by the wet spinning processes as described, for example, in German Pat. No. 1,144,997 and U.S. Pat. No. 3,123,653, after which the extruded films, e.g. tubes, must first of all be solidified in one or more coagulation baths and then may be subjected to further treatments such as drying, tanning and/or softening. One further advantage of the present invention is that the liquid reaction product of the glyoxal and the amino-type compound can be directly added to such aqueous sludges.

Further materials may be added to the mixture of collagen and reaction products of the present invention before use. There may especially be mentioned, in this respect, natural or synthetic fibrous materials such as cellulose, dyestuffs, softeners such as glycerin, sorbitol and carboxymethyl cellulose and fungistatic agents. Typically such materials are added in amounts of up to 25% by weight, preferably up to 15% by weight in the case of fibrous materials, up to 10% by weight in the case of softeners and up to 4% by weight in the case of dyestuffs, based on the dry weight of collagen. Furthermore, binders, such as urea and casein may be added to react with any excess aldehyde.

In the preferred application of the present invention, preparation of collagen films, e.g. sausage casings, the compositions including collagen and the glyoxal-/amino-type precondensate may be shaped by known methods, for example by wet or dry spinning. In a typical dry spinning process the compositions having a relatively high solids content of, for example, from 10 to 15% by weight are extruded through circular slot dies of various designs and the tube so extruded is then dried. Such dry spinning processes are described in the above mentioned German Pat. Nos. 641,169 and 659,490 and suitable die constructions are described, for example, in German Pat. No. 694,902 (U.S. Pat. No. 2,046,541). In wet spinning processes the aqueous collagen-containing sludges having a relatively low solids content are first of all extruded in coagulation baths in order to fix the tubular shape prior to further treatment.

In both processes, upon drying the collagen is hardened and cross-linking bridges are formed between the precondenate and the collagen. Further treatments with other curing agents, softeners etc., which are known per se, can follow and the finished tubular casing can then be subjected to conditioning treatments after which it is then, if desired, shirred or wound up on to transport rollers. The production of such collagen-based compositions and films made therefrom is described for example in the book "Sausage Casing Technology" by Karmas, Noys Data Corporation, Park Ridge, New Jersey (1974).

The following Examples illustrate the invention:

EXAMPLE 1

100 g of granular gelatin are pre-swelled in 1000 ml of water at room temperature and then heated to 100° C.

100 ml of 40% strength glyoxal, d 1.29, are then added and heating is effected for a further hour at 100° C (solution I).

Properties of solution I:
Colour dark brown
Viscosity 50 inches Ford viscosimeter; 2mm, 20° C
V (red/ox); - 120 mV
pH 7.2
Gelation time 20° C in 10% HCl 18% strength; 7 min.
Mixture of skin fibre composition with solution I: 60 kg of skin-fibre composition having a 11% dry collagen content are slowly added in a Zeta kneader to 1200 ml of solution I. The mixture is kneaded for on hour., pH of the final composition is 4.5.

In a conventional plant for producing hide fibre casings a casing is produced from the hide fibre composition manufactured as described above. The casing is not subjected to any additional processing and is dried and wound up at the end of the production path.

Properties of the casing after 21 days:
Water absoprtion capacity; 190% by weight pH; 4.5
Wet tear strength; 4.2 kp/mm$^2$
Elastic modulus; 9.5 kp/mm$^2$ Content which can be washed out with water; approx. 1% by weight Shrinkability in hot water at 75° C; approximately 48% The product is suitable as a casing for raw sausage and can very easily be clipped for this purpose.

EXAMPLE 2

200 g of finely ground skin fibre casing cured with smoke distillate are swelled for ½ hour at room temperature in 1% strength HCl (500 ml), (the HCl can be omitted but then the reaction time is a little longer).

200 ml of glyoxal, 40% strength, d 1.29, are added, the mixture is heated to 100° C and stirred slowly at this temperature for one hour.

The resulting dark brown solution is cooled and diluted with water 1:1 (solution II).

Properties of solution II:
Viscosity 56 inches Ford viscosimeter 2mm; 20° C
V (red/ox); −320 to −350 mV
pH; 5.0
With DC (thin-layer chromatography) no free amino acids appear: no hydrolysate.

Mixture of hide fibre composition with solution II: 10 ml of solution II are kneaded in a Zeta mixer with 500 g of hide fibre composition having 11% dry collagen, and a pH value of 3.0, and mixing is effected for 1 hour. Hide fibre composition; dry substance content 11.3%; pH; 3.5 Films approximately 1/10 mm thick are produced from the hide fibre composition on a roller frame. After 48 hours a water absorption capacity of 280% was achieved and an unusually high wet tear strength in this swelling state was observed.

EXAMPLE 3

50 g of old, chrome-tanned leather was cut into fine strips and added to 125 ml of 2% strength HCl.
With
50 ml of glyoxal 40% strength, d 1.29, were then added and the mixture stirred at 100° for 3½ hours. The resulting solution was dark brown with a small amount of sediment which was easily filtered off by glass wool. With results similar to those in Example 2, hide fibre composition was added to the resulting solution and from this composition films were produced which after a short time exhibited a relatively high wet tear strength.

EXAMPLE 4

92 g of small Vienna sausages were sliced and added to 5 ml of 36% strength HCl and 100 ml of 40% strength glyoxal, d 1.29, heated to 100° C and stirred for ½ hour at this temperature.

A dark brown solution with a small amount of undissolved fatty residues, resulted.

We claim:
1. A preparation for the manufacture of shaped films, such as tubular sausage casings, which comprises
    (a) a collagenous material; and
    (b) 0.1 to 5% by weight, based on the dry weight of collagen in component (a), of a liquid reaction product of glyoxal with a water-insoluble, organic material containing —$NH_2$— or =NH— groups and having a molecular weight of at least 20,000.
2. A preparation as claimed in claim 1, wherein component (a) is an animal hide fibre composition.
3. A preparation as claimed in claim 1, wherein the liquid reaction product is solution.
4. A preparation as claimed in claim 3, wherein the solution is diluted with water.
5. A preparation as claimed in claim 1, wherein said water-insoluble, organic material is casein, collagen, keratin, horn, wool or silk.
6. A preparation as claimed in claim 1, wherein said water-insoluble organic material is collagen in the form of animal hide, cured hide fibre casing, leather or natural gut.
7. A preparation as claimed in claim 1, which contains from 0.2 to 4% by weight of the reaction product in component (b) based on the dry weight of collagen in component (a).
8. A preparation as claimed in claim 1, which contains from 1 to 3% by weight of the reaction product in component (b) based on the dry weight of collagen in component (a).
9. A preparation as claimed in claim 1, further comprising natural and artificial additives selected from the group consisting of fibres, dyestuffs, softeners, fungistatic agents and binders for excess aldehyde.
10. A preparation as claimed in claim 9, wherein said additives are dissolved in the reaction product of component (b).
11. A preparation as claimed in claim 1, wherein the content of collagenous material lies in the range of from 2 to 15% collagen based on the dry weight of collagen present.
12. A preparation as claimed in claim 1, wherein the content of collagenous material lies in the range of from 6 to 15% collagen based on the dry weight of collagen present.
13. A method for manufacturing a shaped article which comprises shaping a preparation containing
    (a) a collagenous material; and
    (b) 0.1 to 5% by weight, based on the dry weight of collagen in component (a), of a liquid reaction product of glyoxal with a water-insoluble, organic material containing —$NH_2$— or =NH— groups and having a molecular weight of at least 20,000.
14. A method as claimed in claim 13, wherein the shaped article is a tubular film.
15. A process as claimed in claim 13, wherein further high molecular organic materials are dissolved in the liquid reaction product prior to being incorporated into the collagenous material.
16. A process as claimed in claim 15, wherein the content of collagenous material lies in the range of 2 to 15% collagen based on the dry weight of collagen present.
17. A shaped article made from a preparation which comprises
    (a) a collagenous material; and
    (b) 0.1 to 5% by weight, based on the dry weight of collagen in component (a), of a liquid reaction product of glyoxal with water-insoluble, organic material containing —$NH_2$— or =NH— groups and having a molecular weight of at least 20,000.
18. A sausage, the casing of which is derived from a preparation which comprises
    (a) a collagenous material; and
    (b) 0.1 to 5% by weight, based on the dry weight of collagen in component (a), of a liquid reaction product of glyoxal with a water-insoluble, organic material containing —$NH_2$— or =NH— groups and having a molecular weight of at least 20,000.
19. A sausage, the casing of which is a tubular film made from animal hide fibre compositions and which contains 0.1 to 5% by weight, calculated on the weight of dry collagen, of a reaction product of glyoxal and a water-insoluble organic material containing one or more $-NH_2-$ or $=NH-$ groups and having a molecular weight of at least 20,000.

20. A process for liquefying a water-insoluble, organic material containing $-NH_2-$ or $=NH-$ groups and having a molecular weight of at least 20,000, comprising at least partially reacting said material with glyoxal.

21. A process as claimed in claim 20, wherein the water-insoluble, high molecular weight material is casein, collagen, keratin, horn, wool or silk.

22. A process as claimed in claim 21, wherein the water-insoluble collagen material is in the form of animal hide, animal hide fibre composition, cured hide fibre casing, leather or natural gut.

23. A process as claimed in claim 22, wherein scrap collagen material is employed.

24. A process as claimed in claim 20, wherein the water-insoluble, high molecular weight material is allowed to swell in water as well as dilute acid, with or without heating, before reacting it with the glyoxal.

25. A process as claimed in claim 20, wherein a mixture of water-insoluble, high molecular weight materials is reached with glyoxal.

26. A process as claimed in claim 20, wherein further high molecular organic materials are dissolved in the liquid produced.

27. A process as claimed in claim 26, wherein said further high molecular organic materials are selected from proteins, celluloses and plastics materials.

28. A process as claimed in claim 20, wherein said water-insoluble, high molecular weight material is a protein.

* * * * *

UNITED STATES PATENT OFFICE
CERTIFICATE OF CORRECTION

Patent No. 4,125,631                    Dated November 14, 1978

Inventor(s) Bruno Stahlberger and Werner von Dach

It is certified that error appears in the above-identified patent and that said Letters Patent are hereby corrected as shown below:

First page, Item 76, "Wiesenstrabe" should read -- Wiesenstrasse-- and "Zweistäpflestrabe" should read -- Zweistäpflestrasse --;
    Item 57, seventh line of ABSTRACT, "collageneous" should read -- collagenous --;
Column 1, line 47, "be" should read -- by --;
Column 2, line 52, "orgnaic" should read -- organic --;
Column 4, line 31, "precondenate" should read -- precondensate --;
    third line from bottom, "absoprtion" should read -- absorption --; and "pH; 4.5" should be placed on the following line, indented;
Column 5, line 4, "The product" should start on a new line;
    line 38, delete "With";
    last line, "solution" should read -- a solution --;
Column 6, line 56, after "with" insert -- a --.

Signed and Sealed this

Tenth Day of April 1979

[SEAL]

Attest:

RUTH C. MASON
Attesting Officer

DONALD W. BANNER
Commissioner of Patents and Trademarks